United States Patent
Scopis et al.

(10) Patent No.: US 10,599,824 B2
(45) Date of Patent: Mar. 24, 2020

(54) AUTHENTICATING ACCESS TO A COMPUTING RESOURCE USING PATTERN-BASED FACIAL RECOGNITION

(71) Applicant: Bank of America Corporation, Charlotte, NC (US)

(72) Inventors: James P. Scopis, Newark, DE (US); Manu Kurian, Dallas, TX (US); Elizabeth S. Votaw, Potomac, MD (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 278 days.

(21) Appl. No.: 15/814,491

(22) Filed: Nov. 16, 2017

(65) Prior Publication Data

US 2019/0147151 A1    May 16, 2019

(51) Int. Cl.
 G06F 21/32   (2013.01)
 H04L 29/06   (2006.01)
 G06K 9/00    (2006.01)

(52) U.S. Cl.
 CPC ......... *G06F 21/32* (2013.01); *G06K 9/00302* (2013.01); *G06K 9/00335* (2013.01); *H04L 63/0861* (2013.01)

(58) Field of Classification Search
 CPC combination set(s) only.
 See application file for complete search history.

(56) References Cited

U.S. PATENT DOCUMENTS

| | | | |
|---|---|---|---|
| 6,681,032 B2 | 1/2004 | Bortolussi et al. | |
| 8,542,879 B1 | 9/2013 | Nechyba et al. | |
| 8,558,663 B2 | 10/2013 | Newman | |
| 8,752,146 B1 | 6/2014 | Van Dijk et al. | |
| 8,831,295 B2 | 9/2014 | Coons | |
| 8,970,348 B1 * | 3/2015 | Evans ..................... | G06K 9/00 340/5.52 |
| 9,147,117 B1 | 9/2015 | Madhu et al. | |
| 9,147,122 B2 | 9/2015 | Chao et al. | |

(Continued)

OTHER PUBLICATIONS

James P. Scopis, et al. U.S. Appl. No. 15/814,563, Entitled Authenticating Access to a Computing Resource Using Facial Recognition Based on Involuntary Facial Movement, 48 pages, filed Nov. 16, 2017.

(Continued)

*Primary Examiner* — Anand P Bhatnagar
(74) *Attorney, Agent, or Firm* — Michael A. Springs

(57) ABSTRACT

According to certain embodiments, an authentication system comprises memory operable to store instructions and processing circuitry operable to execute the instructions, whereby the authentication system is operable to provide a prompt for a user to make a set of facial expressions according to an authentication pattern. The authentication system is further operable to receive user data depicting the set of facial expressions and determine a confidence level based on comparing the user data to validation data. The validation data depicts previously validated facial expressions associated with the user and arranged according to the authentication pattern. The authentication system is further operable to authenticate the user in response to a determination that the first confidence level exceeds a first predefined threshold.

14 Claims, 8 Drawing Sheets

(56) References Cited

U.S. PATENT DOCUMENTS

| | | | |
|---|---|---|---|
| 9,147,123 B2 | 9/2015 | Zeng et al. | |
| 9,147,128 B1 | 9/2015 | Chafni et al. | |
| 9,251,401 B1 | 2/2016 | Koo | |
| 9,300,676 B2 | 3/2016 | Madhu et al. | |
| 9,323,912 B2 * | 4/2016 | Schultz | G06F 21/32 |
| 9,355,236 B1 * | 5/2016 | Kratz | G06F 21/32 |
| 9,426,151 B2 | 8/2016 | Richards et al. | |
| 9,558,524 B2 | 1/2017 | Madhu et al. | |
| 9,594,894 B2 * | 3/2017 | Azar | G06F 21/32 |
| 9,652,663 B2 * | 5/2017 | Lau | G07C 9/00 |
| 9,740,920 B1 | 8/2017 | Chang et al. | |
| 9,916,431 B2 * | 3/2018 | Hwang | G06F 21/316 |
| 9,953,149 B2 * | 4/2018 | Tussy | G06K 9/00288 |
| 2016/0342851 A1 | 11/2016 | Holz et al. | |
| 2017/0006028 A1 * | 1/2017 | Tunnell | H04L 63/0861 |
| 2017/0011820 A1 | 1/2017 | Yin et al. | |
| 2017/0046507 A1 | 2/2017 | Archer et al. | |
| 2017/0053252 A1 | 2/2017 | Votaw et al. | |
| 2017/0270289 A1 * | 9/2017 | Lymberopoulos | G06F 21/31 |
| 2018/0307815 A1 * | 10/2018 | Samadani | G06F 21/32 |
| 2018/0314812 A1 * | 11/2018 | Qin | G06K 9/00 |
| 2019/0149542 A1 * | 5/2019 | Scopis | H04L 63/0861 726/7 |
| 2019/0213316 A1 * | 7/2019 | Tussy | G06F 21/32 |

OTHER PUBLICATIONS

Manu Kurian, et al. U.S. Appl. No. 15/814,643, Entitled Authenticating Access to a Computing Resource Using Quorum-Based Facial Recognition, 48 pages, filed Nov. 16, 2017.

* cited by examiner

| First User | Second User | Third User |
|---|---|---|
| Smile | Tilt chin down | Turn head left |

Facial Expression 442A    Facial Expression 442B    Facial Expression 442C

AUTHENTICATING ACCESS TO A COMPUTING RESOURCE USING PATTERN-BASED FACIAL RECOGNITION

TECHNICAL FIELD

Certain embodiments of the present disclosure relate generally to performing authentication in order to control a user's access to a computing resource. Certain embodiments use facial recognition technology to authenticate the user.

BACKGROUND

Computing systems use security measures to protect hardware, software, or data from maliciously caused destruction, unauthorized modification, or unauthorized disclosure. Security measures may include the use of authentication, password policies, encryption, access control, and other techniques. As an example, authentication may allow one party to verify another party's identity based on a password and/or other authentication factors. Password policies may define criteria that a password must satisfy to be considered valid, for example, a minimum number of characters, required types of characters (e.g., numbers, uppercase letters, lowercase letters, symbols), and/or a time period after which the password shall expire. Encryption may protect the privacy of information by scrambling the information in a manner that only the intended recipient can understand. Access control may grant different users different levels of access to hardware, software, or data depending on the user's credentials. Different types of security measures can be used together to provide increased security.

SUMMARY

According to certain embodiments, an authentication system comprises memory operable to store instructions and processing circuitry operable to execute the instructions, whereby the authentication system is operable to provide a prompt for a user to make a set of facial expressions according to an authentication pattern. The authentication system is further operable to receive user data depicting the set of facial expressions and determine a confidence level based on comparing the user data to validation data. The validation data depicts previously validated facial expressions associated with the user and arranged according to the authentication pattern. The authentication system is further operable to authenticate the user in response to a determination that the first confidence level exceeds a first predefined threshold.

According to certain embodiments, an authentication system comprises memory operable to store instructions and processing circuitry operable to execute the instructions, whereby the authentication system is operable to provide a stimulus that causes an involuntary facial movement of a user. The authentication system is further operable to receive user data in response to the stimulus. The user data depicts the involuntary facial movement of the user. The authentication system is further operable to perform authentication based on comparing the user data to validation data associated with the user. The validation data comprises a previously validated depiction of the involuntary facial movement caused by exposing the user to the stimulus.

According to certain embodiments, an authentication system comprises memory operable to store instructions and processing circuitry operable to execute the instructions, whereby the authentication system is operable to receive first user data depicting a facial expression of a first user, authenticate the first user based on the first user data, and restrict the first user from performing an operation in response to determining that the operation requires authenticating at least one other user in addition to authenticating the first user.

Embodiments of the present disclosure provide technological solutions to technological problems. For example, certain embodiments may increase computer security by increasing the complexity of information analyzed by authentication systems that use facial recognition as an authentication factor. The increased complexity may prevent an unauthorized party that attempts to impersonate the user from being able to trick the authentication system. Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION

For a more complete understanding of the present disclosure and for further features and advantages thereof, reference is now made to the following description taken in conjunction with the accompanying example drawings, in which.

DETAILED DESCRIPTION

Figure 1A:
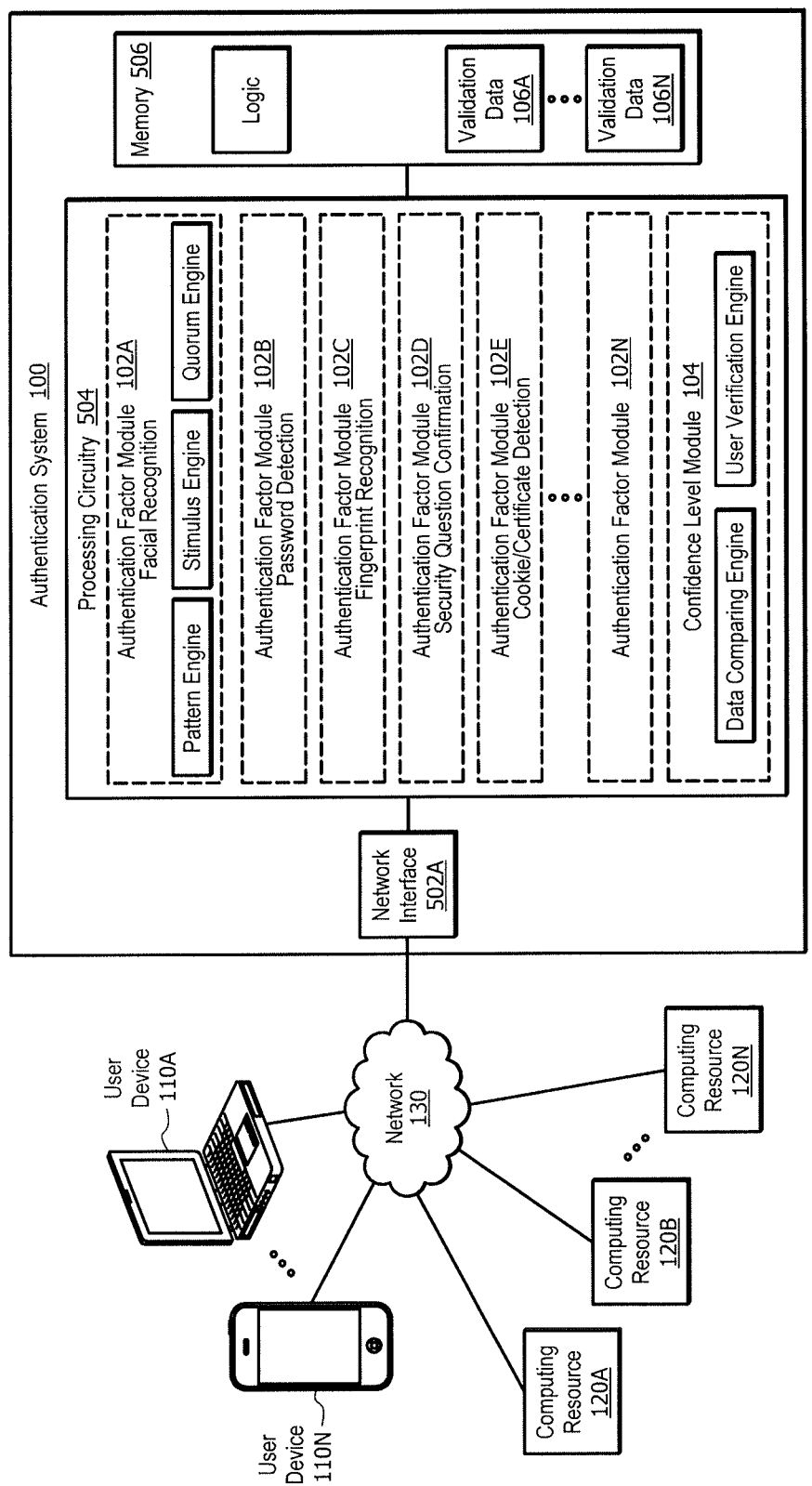
FIGS. 1A-1B illustrate examples of authentication systems configured to authenticate a user, in accordance with certain embodiments.

Computing systems use security measures to prevent unauthorized parties from accessing computing resources, such as hardware, software, and/or data resources. One such security measure is facial recognition. Facial recognition generally refers to computing functionality that verifies the identity of a user based on the user's facial features. As an example, an authentication system configured with facial recognition may receive an input that depicts facial features of a user seeking to access a computing resource. The input could be an image captured by a camera in real-time as the user attempts to access the computing resource. The authentication system compares the facial features received via the input with known information about the user's facial features. Examples of facial recognition techniques include geometric techniques, which look at distinguishing features (such as the relative position, size, and/or shape of the eyes, nose, cheekbones, jaw, and/or other facial features), and photometric techniques, which provide a statistical approach that distills an image into values and compares the values with templates to eliminate variances. In some cases, the known information about the user's facial features may be retrieved from a database or other memory.

Although it may be convenient for the user to use facial recognition as a security measure, existing facial recognition techniques are vulnerable to certain problems. One such problem occurs when an unauthorized party tricks the authentication system by impersonating the user. To impersonate the user, the unauthorized party may use photos or video of the user to generate a 3-D facial model that can defeat authentication systems. It may be fairly easy for the unauthorized party to obtain photos or video of the user, for example, by searching the Internet or recording the user out in public. Moreover, a user's facial features tend to remain relatively constant over time. As a result, facial recognition has been slow to gain acceptance as a security measure as compared to password-based authentication in which a password can be changed (e.g., on a periodic basis or in response to the password being compromised) and can be made complex (e.g., by including a large number of characters and/or different types of characters). Embodiments of the present disclosure may provide a solution to this or other problems.

The present disclosure recognizes that a need exists to increase the complexity/uniqueness of facial features that authentication systems use to authenticate a user. For example, rather than relying solely on a user's normal facial expression (which may be at risk of being replicated by an unauthorized party), certain embodiments allow for using more complex facial characteristics, profiles, and/or levels when performing facial recognition.

According to certain embodiments, an authentication system makes a deeper profile analysis to determine whether to authenticate a user. For example, a machine or mapper can map the user's facial structure to N inches below the skin thus creating an N-profile mapping view. This facial analysis could be programmed to perform natural mappings and/or include certain reactionary body characteristics that include facial muscles, such as a nervous tick, curved smile, eye muscle reaction, facial reaction to certain stimuli, etc. These are recorded either in a static store profile (during the initial capture) or as a dynamic learned track. The user is then checked against those metrics during authentication with allowance for some or no deviations.

According to certain embodiments, authentication systems that analyze a user's facial reaction to a stimulus may allow for increased confidence as compared to authentication systems that analyze "static" facial features associated with the user's normal facial expression. Additionally, authentication systems can analyze the user's facial reaction to a series of multiple stimuli per authentication instance in order to increase complexity/uniqueness of the facial features being verified by the authentication system, which may increase security. That is, multiple stimuli can be configured to trigger multiple facial movements. The selection of stimuli can be configured on a dynamic basis so that a series of facial movements required to pass facial recognition in a first authentication instance would be different than a series of facial movements required to pass facial recognition in a second authentication instance. In some embodiments, the authentication system may determine whether to authenticate the user based on whether a quorum amount of facial movements have been successfully verified. Additional examples are further discussed below, for example, with respect to FIGS. 2A-2C.

According to certain embodiments, an authentication system may be configured to authenticate a user based on one or more artificially created expressions. The artificially created expressions may comprise hidden or non-daily expressions (expressions that an unauthorized party cannot easily replicate by searching the Internet or recording the user out in public). The artificially created expressions can be prompted in real-time during authentication. Additionally, the authentication system can prompt different artificially created expressions during different authentication instances to reduce the possibility of an unauthorized party being able to replicate the expression.

According to certain embodiments, a distortion agent can allow for capturing pre-programmed, artificial (non-normal) expressions at the point-in-time of authentication. For example, the distortion agent could momentarily change the normal facial view/features to a preset artificial expression by configuring the presence or absence of one or more stimuli to one or more portions of the user's face. The stimuli applied by the distortion agent is known only to the authentication system that is performing authentication. The reaction of the user's face to the stimuli and other characteristics would then be compared against a recorded dataset. Because the authentication system knows the stimuli applied by the distortion agent, the authentication system can compare against a recorded dataset associated with the same stimuli.

Any suitable stimuli could be used. As an example, in certain embodiments, suppose user X's normal eye level is −16 degrees (below). The distortion agent could be worn by the user or attached to the facial recognition device to create an experience that alters user X's eye level to +12 degrees (above). As another example, in certain embodiments, the distortion agent comprises a micro-pulse generator that causes user X's muscles to react. Muscle reactions tend not to be easily observed under ordinary circumstances and are therefore difficult for an unauthorized party to replicate. As another example, in certain embodiments, the distortion agent could apply pressure to an optical lens (e.g., apply a puff of air to a contact lens-like sensor on the user's eye). The sensor can send information to a bio-reader that indicates how the user's eye responds to the applied pressure.

Additional examples of performing facial recognition based on artificially created (involuntary) expressions are further discussed below, for example, with respect to FIGS. 3A-3B.

According to certain embodiments, the authentication system supports multiple users and timed scenarios. Each user can create a range of voluntary and/or artificial expressions to be stored by the authentication system for use during future authentication attempts. The authentication system can authenticate the user based on any suitable combination of the stored facial expressions, and the facial expressions being checked by the authentication system can change from one authentication attempt to the next. In certain embodiments, the user can provide an initial set of facial expressions during registration and can provide additional facial expressions after registering with the authentication system. For example, the user can be authenticated for a first session based on a facial expression provided at registration. During the first session, the user can provide additional facial expressions. The additional facial expressions can be used in the future to authenticate the user for a second session.

According to certain embodiments, an authentication system uses a facial collage that authenticates facial features from multiple users in order to increase the level of difficulty in accessing sensitive systems. The collage of facial data points are then fed into the authentication system, and the system allows the users to access the system if a certain number of users (e.g., a quorum) pass authentication. The multiple users can create the collage of facial expressions (e.g., facial authentication profile) in a predetermined order or randomized order, depending on the embodiment. Each user could provide a "piece" of the puzzle. As an example, suppose users 1 through 10 are registered for use of a system. In certain embodiments, authenticating 3 of the 10 allows access to level 1, and authenticating 6 of the 10 allows access to level 2. Each collage can form a new authentication scheme. In certain embodiments, each user can provide a respective piece of the authentication collage without knowledge of the other users in order to minimize collusion.

Figure 1B:
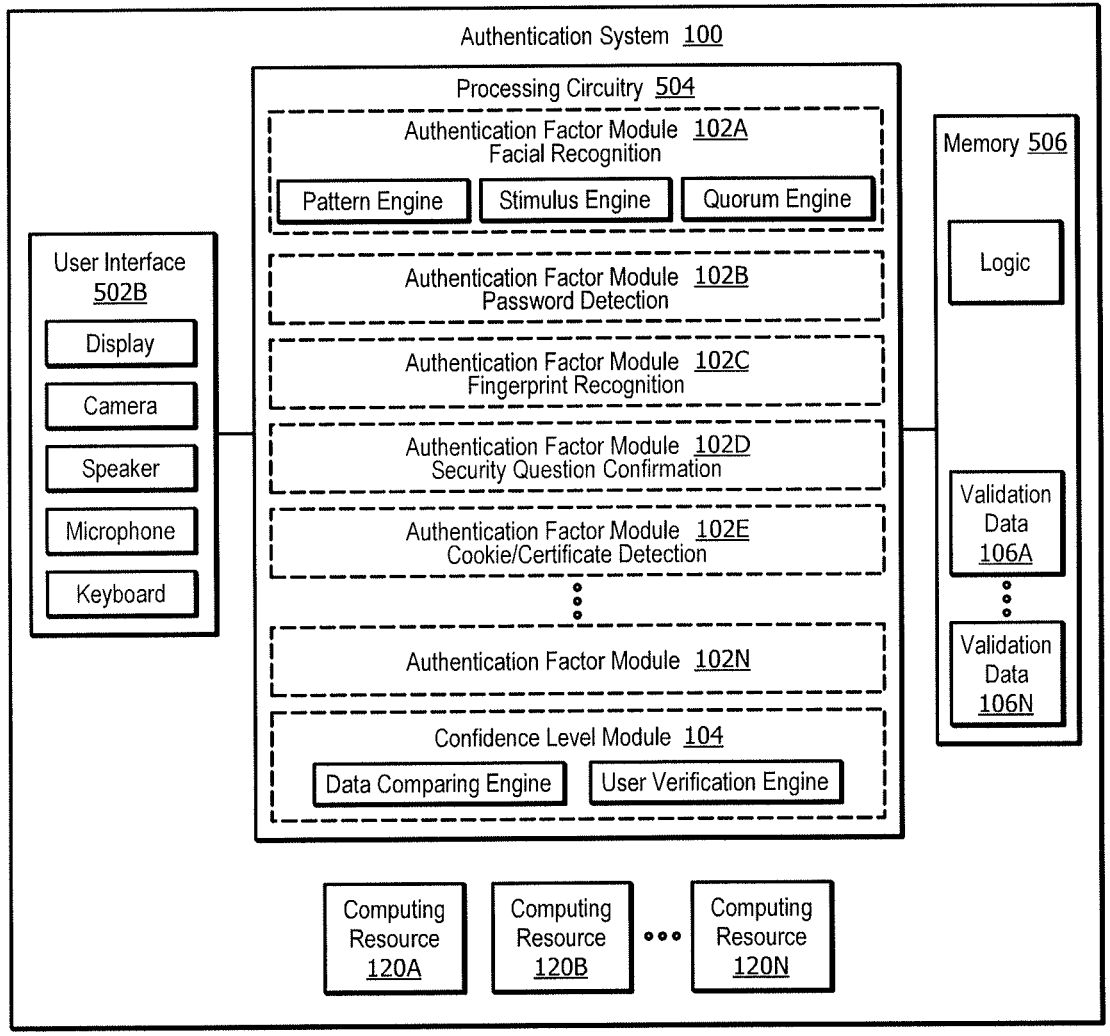

Additional examples of performing facial recognition based on a quorum of users are further discussed below, for example, with respect to FIGS. 4A-4B Certain embodiments of the above-discussed features may be implemented in accordance with one or more of FIGS. 1-5, like numerals used to describe like components of the various figures. FIGS. 1A and 1B each illustrate an example of an authentication system 100 configured to authenticate a user, in accordance with certain embodiments. FIG. 1A illustrates an example in which functionality is distributed in a networked environment, and FIG. 1B illustrates an example in which functionality is performed locally on a user device (such as user device 110). According to certain embodiments, authentication system 100 comprises one or more interfaces 502 operable to receive inputs and to send outputs, one or more memories 506 operable to store instructions or logic, and processing circuitry 504 operable to execute the instructions/logic, whereby the authentication system 100 is operable to perform one or more facial recognition methods, such as any one or more of the methods described below with respect to FIGS. 2-4. Examples of interface 502, processing circuitry 504, and memory 506 are further described below with respect to FIG. 5.

With respect to FIG. 1A, in certain embodiments, an authentication system 100 is configured to communicate with one or more user devices 110a-n and one or more computing resources 120a-n via a network 130. In general, authentication system 100 performs authentication of users that interact with user devices 110 in order to access computing resources 120. In certain embodiments, authentication system 100 may comprise a server, a cloud-based system, or other suitable system. In certain embodiments, authentication system 100 may be associated with an institution (e.g., authentication system 100 may be within an enterprise network of the institution or hosted by a cloud service provider on behalf of the institution).

The authentication system 100 shown in FIG. 1A includes a network interface 502A, processing circuitry 504, and memory 506. Network interface 502A communicates with user devices 110a-n and computing resources 120a-n via network 130. In certain embodiments, processing circuitry 504 executes logic stored in memory 506. The logic may comprise instructions that enable processing circuitry 504 to provide the functionality of one or more authentication factor modules 102a-102n and a confidence level module 104. In general, each authentication factor module 102 may prompt a user to provide a certain type of user data to be authenticated by authentication system 100, and confidence level module 104 may determine whether the user data received in response to such a prompt passes authentication.

Each authentication factor module 102 may be configured to authenticate users according to a corresponding authentication factor. Different embodiments of authentication system 100 may include different combinations of authentication factor modules 102 depending on the security needs. As examples, in certain embodiments, authentication system 100 comprises one or more of authentication factor module 102a operable to authenticate users based on facial recognition, authentication module 102b operable to authenticate users based on password detection, authentication factor module 102c operable to authenticate users based on fingerprint recognition, authentication factor module 102d operable to authenticate users based on security question confirmation, authentication factor module 102e operable to authenticate users based on cookie or certificate detection, and/or authentication factor module 102n operable to authenticate users based on any other suitable authentication factor.

Authentication factor modules 102a-n may be prioritized such that one or more authentication factor modules 102 are used as the primary form of authentication and the other authentication factor modules 102 are used as a backup form of authentication in the event that the primary form of authentication is insufficient to authenticate user 110. As one example, in certain embodiments, authentication factor module 102a may be configured to provide facial recognition as the primary form of authentication.

Authentication factor module 102a may include one or more of a pattern engine, a stimulus engine, and/or a quorum engine. In certain embodiments, the pattern engine prompts the user to make a set of facial expressions according to an authentication pattern. For example, the pattern engine may communicate an instruction that causes user device 110 to display the prompt to the user. The pattern engine then receives user data from the user (e.g., user device 110 may collect the user data and send it via network 130 to authentication system 100). The user data depicts the set of facial expressions performed by the user in response to the prompt. The pattern engine provides the user data and corresponding validation data 106 to the confidence level module 104. The validation data 106 depicts previously validated facial expressions associated with the user and arranged according to the authentication pattern. In certain embodiments, the validation data 106 may be retrieved from memory 506. Confidence level module 104 includes a data comparing engine operable to determine a confidence level based on comparing the user data to the validation data 106. Confidence level module 104 further includes a user verification engine operable to authenticate the user in response to a determination that the confidence level exceeds a pre-defined threshold. Additional examples of pattern-based facial recognition that can be performed by the pattern engine and confidence level module 104 are described below with respect to FIGS. 2A-2C.

In certain embodiments, the stimulus engine provides a stimulus that causes an involuntary facial movement of a user. As an example, the stimulus engine may communicate a signal that causes user device 110 or other equipment proximate to the user to generate an electric pulse, pressure, light, or other stimulus that causes an involuntary facial movement of the user. The signal may indicate specific properties of the stimulus to be generated by user device 110 or other equipment proximate to the user, such as location, duration, or intensity of the electric pulse, pressure, light, etc. In response, the stimulus engine receives user data depicting the involuntary facial movement of the user (e.g., user device 110 may collect the user data and send it via network 130 to authentication system 100). The stimulus engine provides the user data and corresponding validation data 106 to the confidence level module 104. The validation data 106 may be retrieved from memory 506, and it comprises a previously validated depiction of the involuntary facial movement caused by exposing the same user to the same stimulus. The confidence level module 104 performs authentication based on comparing the user data to the validation data 106 associated with the user. Additional examples of stimulus-based facial recognition that can be performed by the stimulus engine and confidence level module 104 are described below with respect to FIGS. 3A-3B.

In certain embodiments, the quorum engine receives user data depicting a facial expression of a first user. The quorum engine authenticate the first user based on the user data. For example, the quorum engine may send the user data and corresponding validation data 106 for comparison and verification by the confidence level module 104. The quorum engine is further operable to determine that an operation that the user wishes to perform requires authenticating at least one other user (in addition to authenticating the first user), and to restrict the first user from performing the operation until the at least one other user has been authenticated. Additional examples of quorum-based facial recognition that can be performed by the quorum engine and confidence level module 104 are described below with respect to FIGS. 4A-4B.

In certain embodiments, pattern engine, stimulus engine, and/or quorum engine may work together to increase complexity of the facial expressions required to authenticate the user. As one example, certain embodiments may require a quorum of users determined by the quorum engine to perform patterns of facial expressions determined by the pattern engine, and the patterns can include involuntary movements triggered by the stimulus engine.

User device 110 is a non-limiting term that generally refers to equipment that a user employees in order to interact with authentication system 100 and/or to access a computing resource 120. Examples of user device 110 include a personal computer, a laptop, a tablet computer, a smartphone, a mobile phone, a handheld device, a wireless device, a wearable device, etc. Depending on the context, a user may refer to a person that enters input and receives output from a user device 110, or an account or profile associated with that person. As an example, a person might use a mobile phone to access a work-related computing resource 120a and a home-related computing resource 120b. Certain embodiments may consider a profile used to access the work-related computing resource 120a as one user, and may consider a profile used to access the home related computing resource 120b as a different user (even though the profiles belong to the same person and run on the same mobile phone). In certain contexts, information sent from authentication system 100 to the user device 110 (or a user interface 502B) may be considered to be information sent to the user (because the user receives the information via user device 110 or user interface 502B), and information received by authentication system 100 from the user device 110 (or user interface 502B) may be considered to be information received from the user (because the user sends the information to authentication system 100 via user device 110 or user interface 502B).

Examples of a computing resource 120 include a cloud object, a hardware resource (such as an interface, memory, or processing circuitry), a software resource (such as an application), electronic data, or a collection of any one or more of the preceding (such as a collection that includes two cloud objects, a collection that includes a hardware resource and a software resource, etc.). In certain embodiments, authentication may be used to authenticate a user to perform an operation. Performing the operation may involve accessing one or more computer resources 120. Thus, authentication may be used to authenticate a user's access to computing resources 120 required to perform the operation.

As one example, a user may be a customer that authenticates with an authentication system 100 associated with a financial institution in order to interact with computing resources 120 of the financial institution that enable the user to perform the operation of transferring funds from the user's financial account to a third party financial account (such as a financial account associated with a merchant). As another example, a user may be an employee of an enterprise that authenticates with authentication system 100 in order to interact with computing resources 120 of the enterprise, such as a server or database that contains proprietary information maintained by the enterprise.

Network 130 represents any suitable network(s) operable to facilitate communication between authentication system 100, user devices 110, and computing resources 120. Network 130 may include any interconnecting system capable of transmitting audio, video, signals, data, messages, or any combination of the preceding. Network 130 may include all or a portion of a public switched telephone network (PSTN), a cellular network, a base station, a gateway, a public or private data network, a LAN, a MAN, a WAN, a WWAN, a local, regional, or global communication or computer network, such as the Internet, a wireline or wireless network, an enterprise intranet, or any other suitable communication link, including combinations thereof, operable to facilitate communication between the components.

FIG. 1B illustrates an example in which functionality is performed locally on a user device (such as user device 110). The components of the authentication system shown in FIG. 1B are generally analogous to the components of the authentication system shown in FIG. 1A. In the embodiment of FIG. 1B, authentication system 100 may receive input from the user and send output to the user via one or more user interfaces 502B integrated with or connected to the user device. Examples of user interfaces 502B include a display (e.g., monitor, screen, touchscreen, graphical user interface), a camera (or other sensor) operable to observe facial expressions/facial movements of the user, audio interfaces (e.g., speaker and/or microphone), keyboard, mouse, etc. In certain embodiments, processing circuitry 504 and memory 506 may be internal to user device 110 and may be operable to authenticate access to a profile, an app, or other computing resources 120 local to user device 110.

For purposes of example and explanation, FIGS. 1A-1B depict the network as including certain components. However, this disclosure recognizes that the network may include any suitable components. One of ordinary skill in the art will appreciate that certain components can be omitted and other components not mentioned herein can be added. Additionally, components can be integrated or separated in any suitable manner. Similarly, functionality can be distributed or localized in any suitable manner. For example, in addition to the network embodiments described with respect to FIG. 1A and the user device embodiment described with respect to FIG. 1B, certain embodiments may use an authentication system 100 running on user device 100 to authenticate access to network-based computing resources 120, and other embodiments may use a cloud-based authentication system 100 running in the network to authenticate access to local computing resources 120 (such as an app located on user device 110).

Figure 2A:
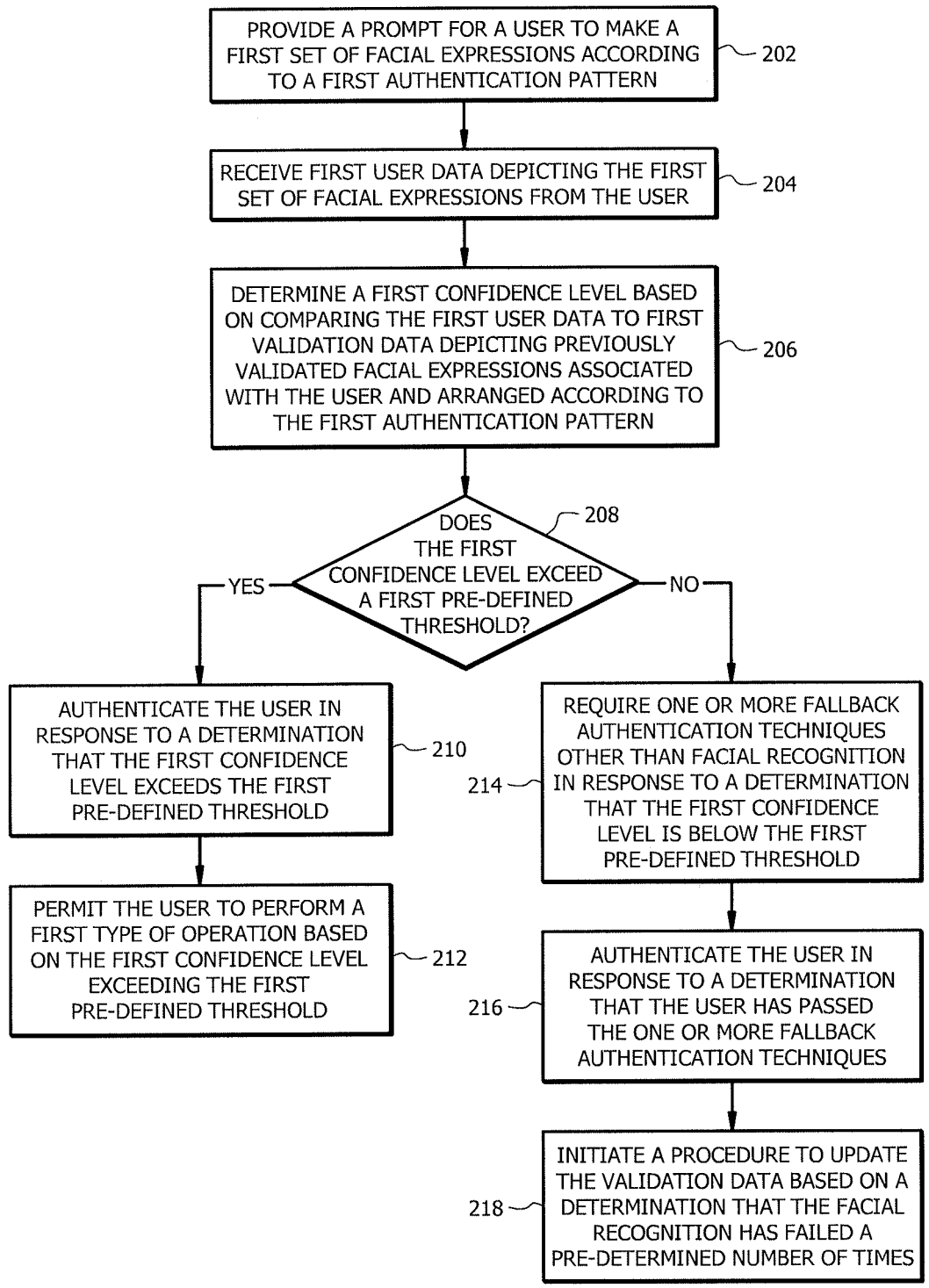
FIGS. 2A-2B illustrate examples of methods for authenticating access to a computing resource using pattern-based facial recognition, in accordance with certain embodiments.
Figure 2B:
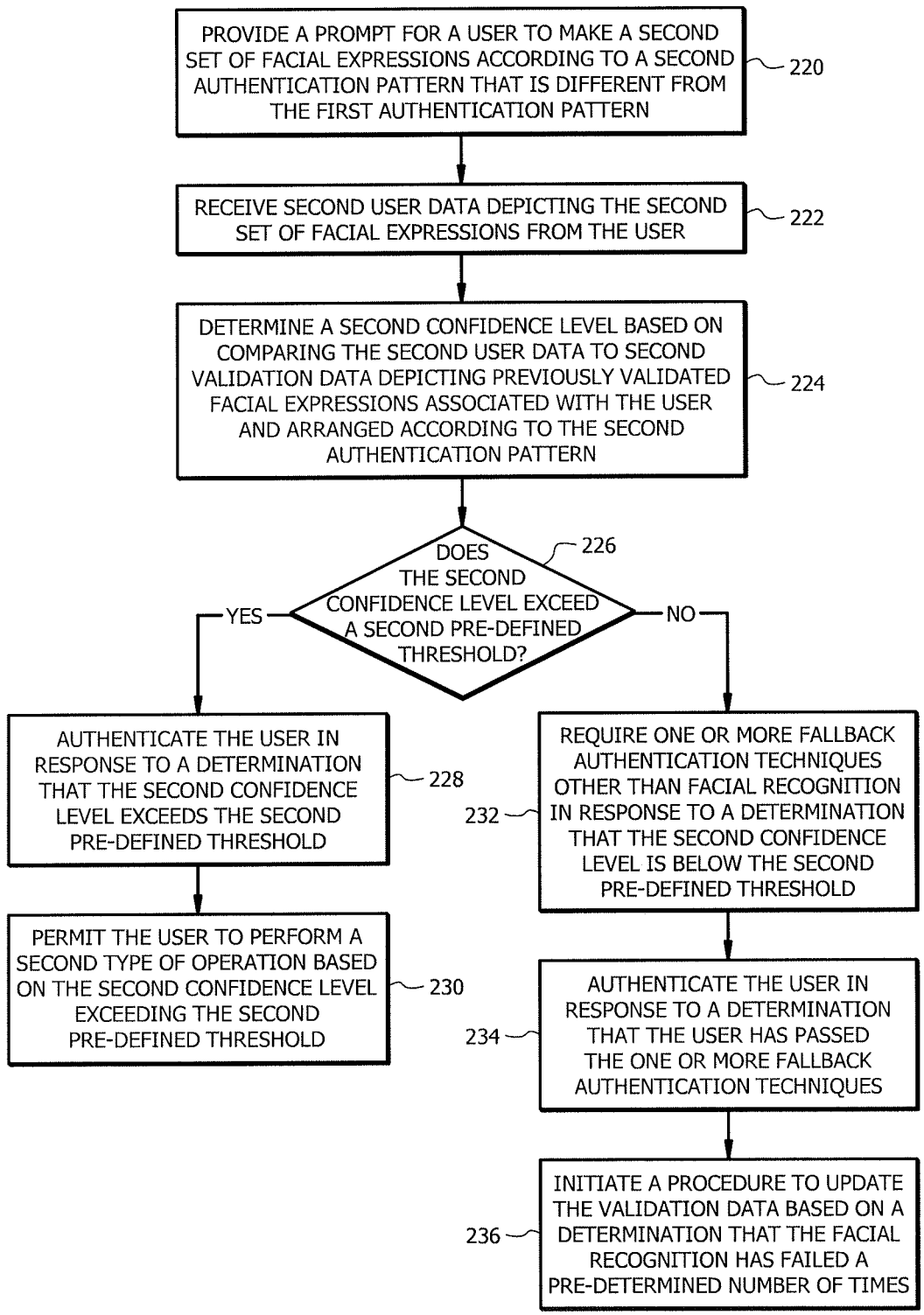

FIGS. 2A-2B illustrate examples of methods for authenticating access to a computing resource using pattern-based facial recognition, in accordance with certain embodiments. According to certain embodiments, the method may be performed by the authentication system 100 described with respect to FIG. 1A and/or FIG. 1B.

Beginning with FIG. 2A, at step 202, the method provides a prompt for a user to make a first set of facial expressions 242 according to a first authentication pattern 240A. The prompt can be provided in response to determining that verification of the user is required, for example, if the user requests to access a computing resource that requires user verification, if a timer has expired since the user was last verified/successfully authenticated, or if status information indicates that the user is not currently logged in.

The first authentication pattern 240A provided at step 202 includes at least two facial expressions 242 arranged in a sequence that is known to the authentication system 100. The first authentication pattern 240A may be selected at random or pre-configured by the user. In embodiments that select the first authentication pattern 240A at random, the first authentication pattern 240A can be different than an authentication pattern used in a previous or subsequent authentication attempt (in order to reduce the likelihood of an unauthorized party being able to predict and impersonate the first authentication pattern 240A). The method can configure any suitable number of facial expressions 242 for the first authentication pattern 240A. In general, increasing the number of facial expressions 242 increases complexity and makes it more difficult for an unauthorized party to impersonate the user.

The facial expressions 240 in the pattern can include voluntary facial expressions 242 and/or involuntary facial expressions 242. As an example, the method may prompt the user to make voluntary facial expressions 242 by providing the user with instructions to perform a gesture. The instructions may be provided in any suitable format, such as visual instructions communicated to a display screen (e.g., in the form of text, graphics, and/or video, etc.) or an audio message communicated to a speaker. In certain embodiments, the instructions are general, for example, "perform first authentication pattern," which may prompt the user to perform a series of facial expressions 242 that the user has pre-configured and memorized. In certain embodiments, the instructions are specific, for example, "smile for two seconds" or "wink left eye for three seconds," which may allow the authentication system 100 to select the first authentication pattern 240A at random without the user having to know the first authentication pattern 240A in advance.

Figure 2C:
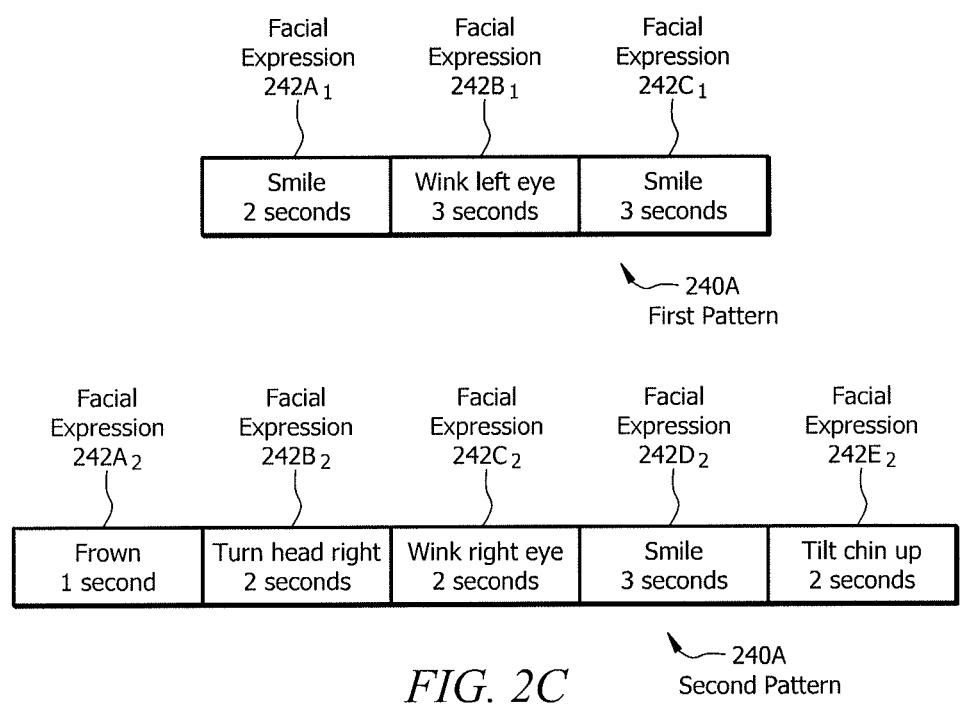
FIG. 2C illustrates examples of patterns that may be used for pattern-based facial recognition, in accordance with certain embodiments.

Examples of gestures that the user may be instructed to perform include tilting the user's head up, down, left, or right; smiling; frowning; winking; blinking; moving the user's eyes to look up, down, left, or right; holding a camera that captures the user's facial expression 242 at various angles (e.g., above the face, below the face, etc.). The instructions may further indicate a time period to maintain each facial expression 242. The time period may be the same for some or all of the facial expressions 242, or the time period may be varied from one facial expression to the next, depending on the embodiment. FIG. 2C illustrates one example of a first authentication pattern 240A in which the set of facial expressions comprises an ordered sequence in which the user is instructed to smile for 2 seconds (facial expression $242A_1$), wink his or her left eye for 3 seconds (facial expression $242B_1$), and then smile again for 3 seconds (facial expression $242C_1$).

In addition, or in the alternative, the method may prompt the user to make involuntary facial expressions 242 by providing a stimulus, such light, pressure, or an electric pulse that causes an involuntary facial movement from the user, such as a movement of the user's eyes or facial muscles. Examples of providing a stimulus are further described below with respect to FIGS. 3A-3B.

At step 204, the method receives first user data depicting the first set of facial expressions 242 from the user (i.e., the set of facial expressions 242 that the user makes in response to the prompt provided at step 202). The first user data may generally be received in real-time by any suitable sensor. As an example, the sensor may comprise a camera or x-ray configured to sense the user's facial expressions 242. The camera can be configured to sense the user's facial expressions 242 at any suitable level, depending on the embodiment. As an example, certain embodiments may sense the user's facial expressions at the surface of the user's skin. As another example, certain embodiments may sense the user's facial expressions 242 at a level that is not visible to the naked eye, such as at the skeletal or muscular level (e.g., authentication system may observe a pre-configured depth below the surface of the user's skin).

At step 206, the method determines a first confidence level based on comparing the first user data to first validation data. In certain embodiments, the first validation data may be retrieved from a database or other memory of authentication system 100. The first validation data depicts previously validated facial expressions 242 associated with the user. Previously validated facial expressions 242 refer to facial expressions 242 that were previously captured and validated as being associated with the user, for example, because the facial expressions 242 were captured when the user initially registered with authentication system 100 or during a previous time period when the user was successfully authenticated with the authentication system 100. To successfully authenticate with authentication system 100 during the previous time period, the user could have used any suitable authentication technique (or combination of authentication techniques), such as password authentication, fingerprint authentication, facial recognition, and/or other authentication technique.

The first validation data is arranged according to the first authentication pattern 240A. For example, the same prompt used to capture the first validation data can be used as the prompt in step 202 to capture the first user data. Or, the method may retrieve individual previously validated facial expressions and combine them together in a sequence corresponding to the prompt provided in step 202. Continuing with the example above, the first validation data depicts the user smiling for 2 seconds (facial expression $242A_1$), winking his or her left eye for 3 seconds (facial expression $242B_1$), and then smiling again for 3 seconds (facial expression $242C_1$).

The confidence level indicates how closely the first user data corresponds to the first validation data. The confidence level can be determined using any suitable algorithm. For example, the confidence level can be determined based on comparing distinguishing features of the user (such as the relative position, size, and/or shape of the eyes, nose, cheekbones, jaw, and/or other facial features) and/or based on photometric techniques. The confidence level can be represented any suitable format, such as a score, a percentage match, a statistical value (e.g., median or average value or standard deviation), etc. In general, the greater the similarities between the first user data and the first validation data, the greater the confidence level.

Because the method of FIG. 2A arranges both the first user data and the first validation data according to the first authentication pattern 240A, the confidence level decreases if the method detects an incorrect facial expression 242 during one or more portions of the pattern. Continuing with the example above, if the user maintained a neutral facial expression in response to prompts to smile (facial expression $242A_1$), wink (facial expression $242B_1$), and smile again (facial expression $242C_1$), the confidence level would decrease as compared to the case in which the user performed the correct gestures when prompted.

In certain embodiments, authentication system 100 may be configured to accommodate a facial impairment of the user. As an example, suppose a user has an injury that prevents the user from winking the left eye. The authentication system 100 may accommodate this impairment by building the impairment into the user's profile. That is, the inability to wink the left eye would appear in both the first user data and the first validation data such that the confidence level would be high even though the impairment prevented the user from complying with the prompt. Alternatively, in certain embodiments, the authentication system 100 is configured to detect (or to allow the user to configure) areas of impairment that the authentication system ignores when determining the confidence level. For example, if the impairment prevents the user from winking the left eye in a consistent manner, the authentication system 100 can ignore the left eye while continuing to analyze other portions of the user's face that are not affected by the impairment.

At step 208, the method determines whether the first confidence level exceeds a first pre-defined threshold. The first pre-defined threshold may be set less than 100% to allow some flexibility and variability because it is not expected that the user would be able to consistently make the exact same facial expression. If at step 208 the method determines that the first confidence level exceeds the first pre-defined threshold, the method proceeds to step 210. At step 210, the method authenticates the user (i.e., the user successfully passes authentication) in response to a determination that the first confidence level exceeds the first pre-defined threshold. The method then proceeds to step 212 in which the user is permitted to perform a first type of operation based on the first confidence level exceeding the first pre-defined threshold. As an example, the first type of operation may comprise accessing a certain computing resource, such as a hardware resource, software resource, data resource, or combination thereof.

If at step 208 the method had determined that the first confidence level fell below the first pre-defined threshold, the method would have skipped steps 210 and 212 and proceeded to step 214. At step 214, the method requires one or more fallback authentication techniques other than facial recognition in response to a determination that the first confidence level is below the first pre-defined threshold. Examples of fallback authentication techniques may include password-based authentication, fingerprint authentication, security question confirmation, cookie or certificate detection, other authentication techniques, or a combination of the foregoing. In some embodiments, the method may prompt the user to perform the fallback authentication technique via the same interface that was used to attempt facial recognition. As an example, an authentication app running on the user's smartphone may handle the facial recognition attempt and may display a request for the user to enter a password if facial recognition fails. In addition, or in the alternative, some embodiments may send an alert to the user based on contact information that the user has previously registered with the authentication system (e.g., contact information that the authentication system stores in a profile associated with the user). The alert could be an email sent to a previously registered email address, a text message or voice call to a previously registered phone number, etc. In some embodiments, the alert may include information that the user is required to provide to the authentication system, such as a temporary password or a unique link to a website that the user clicks so that the authentication system can verify the user. Optionally, the fallback procedure can be configured to verify other authentication factors after the user has clicked the link, provided the temporary password, and/or performed any other action requested by the alert.

At step 216, the method authenticates the user in response to a determination that the user has passed the one or more fallback authentication techniques. At step 218, after successfully authenticating the user using the one or more fallback authentication techniques, the method optionally initiates a procedure to update the validation data. For example, the procedure to update the validation data may be initiated based on a request from the user or in response to a determination that facial recognition has failed a pre-determined number of times, such as 1 time, 2 times, 3 times, . . . or N times. Failing facial recognition may indicate that there is an error in the previously collected validation data or that the user's facial features have changed, for example, due to injury or aging. Thus, the method prompts the user to make one or more facial expressions 242 that can be captured and used as validation data during future facial recognition-based authentication attempts.

FIG. 2B illustrates a method for authenticating access to a computing resource using pattern-based facial recognition. FIG. 2B is generally similar to FIG. 2A, however, FIG. 2B uses a second authentication pattern 240B that is different from the first authentication pattern 240A in at least one respect, such as number of facial expressions 242 per authentication pattern, sequence of facial expressions, hold-time of facial expressions, type of facial expression (e.g., voluntary or involuntary), etc.

As an example, FIG. 2C illustrates an embodiment in which the first authentication pattern includes smiling for 2 seconds (facial expression $242A_1$), winking the left eye for 3 seconds (facial expression $242B_1$), and then smiling again for 3 seconds (facial expression $242C_1$), whereas the second authentication pattern 240B includes frowning for 1 second (facial expression $242A_2$), turning the head right for 2 seconds (facial expression $242B_2$), winking the right eye for 2 seconds (facial expression $242C_2$), smiling for 3 seconds (facial expression $242D_2$), and tilting the chin up for 2 seconds (facial expression $242E_2$). Using different authentication patterns 240 for different authentication attempts may prevent an unauthorized party from predicting the authentication pattern and may therefore reduce the likelihood of the unauthorized party impersonating the user.

At step 220, the method provide a prompt for the user to make a second set of facial expressions according to the second authentication pattern 240B that is different from the first authentication pattern 240A. The prompt can be provided after the user has become unauthenticated from the previous session (e.g., if the user signed off the previous session or if a timer has expired since the user was last verified/successfully authenticated). The prompt can also be provided if the user is currently authenticated for one level of access, but wishes to authenticate for an increased level of access (e.g., in order to access additional computing resources or to perform operations that require further authentication). In some embodiments in which the user wishes to authenticate for an increased level of access, the second authentication pattern 240B may be more complex than the first authentication pattern 240A (e.g., more facial expressions 242 or different types of facial expressions 242—such as involuntary facial expressions).

At step 222, the method receives second user data depicting the second set of facial expressions 242 from the user. At step 224, the method determines a second confidence level based on comparing the second user data to second validation data. The second validation data depicts previously validated facial expressions 242 associated with the user and arranged according to the second authentication pattern 240B. At step 226, the method determines whether the second confidence level exceeds a second pre-defined threshold. If at step 226, the method determines that the second confidence level exceeds the second pre-defined threshold, the method proceeds to step 228 and authenticates the user in response to a determination that the second confidence level exceeds the second pre-defined threshold. At step 230, the method permits the user to perform a second type of operation based on the second confidence level exceeding the second pre-defined threshold.

The second pre-defined threshold can be the same or different than the first pre-defined threshold. For example, in certain embodiments, the method permits the user to perform a first type of operation based on the first confidence level exceeding the first pre-defined threshold (step 212 of FIG. 2A) and permits the user to perform a second type of operation based on the second confidence level exceeding the second pre-defined threshold (step 230 of FIG. 2B). By itself, the first confidence level exceeding the first pre-defined threshold is insufficient to permit the user to perform the second type of operation. As one example, the first type of operation may allow the user to perform computerized banking transactions below a certain dollar amount (such as $100) and the second type of operation may allow the user to perform computerized banking transactions above that dollar amount. As another example, the first type of operation may allow the user access to basic computing resources (such as read-only access to a database) and the second type of operation may allow the user access to computing resources that require higher security clearance (such as read/write access to the database). As another example, the first type of operation may allow access to a first profile associated with the user (such as a profile for performing regular functionality), and the second type of operation may allow access to a second profile associated with the user (such as a profile to perform higher level functionality, such as responding to a panic event or performing administrative functions).

In certain embodiments, the confidence level may be based on a quorum of facial expressions 242 required to perform an operation. For example, if an authentication pattern 240 comprises ten facial expressions 242, the quorum may require eight out of ten matches to perform the first type of operation (such as transferring less than $100) and may require ten out of ten matches to perform the second type of operation (such as transferring more than $100).

If at step 226, the method had determined that the second confidence level was below the second pre-defined threshold, the method would skip steps 228 and 230 and would proceed to step 232. Step 232 requires one or more fallback authentication techniques other than facial recognition in response to a determination that the second confidence level is below the second pre-defined threshold. In response to a determination that the user has passed the one or more fallback authentication techniques, the method authenticates the user in step 234. At step 236, the method optionally initiates a procedure to update the validation data based on a determination that facial recognition has failed a pre-determined number of times.

Figure 3A:
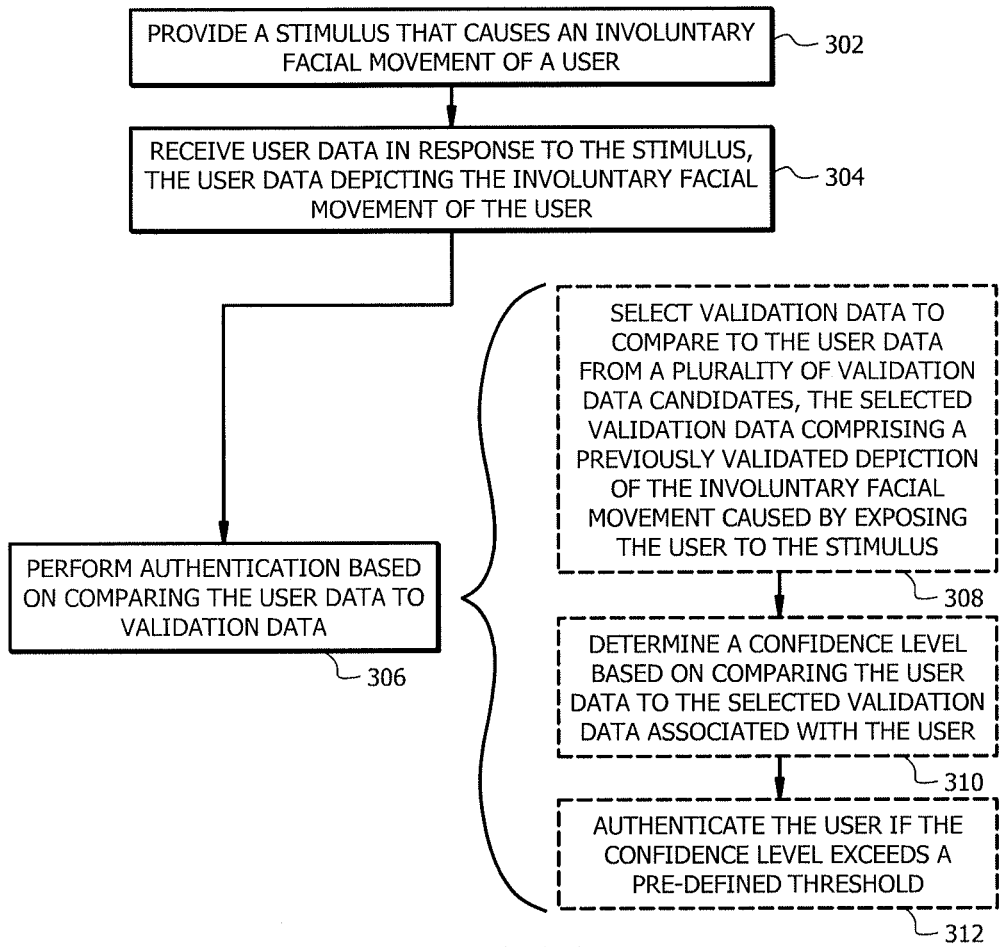
FIGS. 3A-3B illustrate examples of methods for authenticating access to a computing resource using facial recognition based on involuntary facial movement, in accordance with certain embodiments.
Figure 3B:
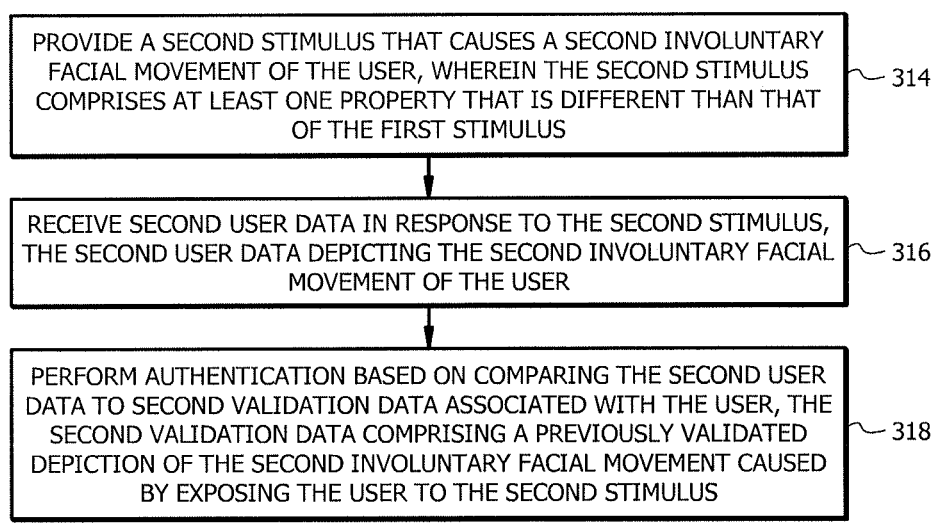

FIGS. 3A-3B illustrate examples of methods for authenticating access to a computing resource using facial recognition based on involuntary facial movement, in accordance with certain embodiments. According to certain embodiments, the method may be performed by the authentication system 100 described with respect to FIG. 1A and/or FIG. 1B.

Beginning with FIG. 3A, at step 302, the method provides a stimulus that causes an involuntary facial movement of a user. As one example, in certain embodiments, the stimulus comprises one or more electrical pulses configured to cause involuntary movement of the user's facial muscles. As another example, in certain embodiments, the stimulus comprises a light configured to cause involuntary movement of the user's eyes. The involuntary movement can be completely involuntary (e.g., monitor changes in the eye, such as dilation when exposed to light) or can include a voluntary component and an involuntary component (e.g., instruct the user to watch a moving light and monitor associated involuntary movements, such as the speed/angle/degree of eye movement). As another example, in the stimulus comprises an optical lens configured to cause involuntary movement of the user's eyes in response to pressure or an electrical pulse. As another example, in certain embodiments, the stimulus may be configured to detect skin tissue differences. For example, a pulse may be sent through a sensor to detect differences, similar to a radar. In certain embodiments, the user's skin can be mixed with some bio-agent to detect skin variations. In certain embodiments, the skin tissue scan may be configured to confirm that the sensor is observing actual skin, rather than a photograph depicting skin or a three dimensional mask overlaid with a photograph.

At step 304, the method receives user data in response to the stimulus. The user data depicts the involuntary facial movement of the user. The user data may be received from any suitable sensor(s) configured to monitor the involuntary movements triggered by the stimulus of step 302. As an example, if the stimulus is an electrical pulse configured to cause involuntary movement of the user's facial muscles, the sensor may be configured to capture information about the movements or reaction times of the user's facial muscles, such as a camera that can view below the surface of the user's skin. As another example, if the stimulus is a light, the sensor may be a camera configured to monitor movements of the user's eyes. As another example, if the stimulus is pressure applied to the user's face or eyes, the sensor may comprise a pressure sensor or camera that monitors deformations caused by applying pressure.

At step 306, the method performs authentication based on comparing the user data to validation data associated with the user. The validation data comprises a previously validated depiction of the involuntary facial movement caused by exposing the user to the stimulus. The previously validated depiction of the involuntary facial movements refers to facial movements that were previously captured when the user was exposed to the stimulus and validated as being associated with the user, for example, because the facial movements were captured when the user initially registered with authentication system 100 or during a previous time period when the user was successfully authenticated with the authentication system 100.

Step 306 may include one or more substeps, according to certain embodiments. For example, in some embodiments, step 306 includes substeps 308, 310, and or 312. At step 308, the method selects the validation data to compare to the user data from a plurality of validation data candidates. Each validation data candidate is associated with a respective stimulus. The method selects the validation data candidate to compare to the user data based on correlating the stimulus associated with the selected validation data candidate with the stimulus that was used in step 302 to prompt receipt of the user data. As an example, if at step 302 the method applied an electrical pulses in the following sequence: forehead, right cheekbone, left cheekbone, then the method selects the validation data in which the electrical pulses were applied in the sequence of forehead, right cheekbone, left cheekbone. As another example, if at step 302 the method instructed the user to watch a light that moved slowly from left to right and then quickly from top to bottom, the method selects the validation data in which the light moved slowly from left to right and then quickly from top to bottom. As another example, if at step 302 the method applied a scanner to detect skin tissue variations, the validation data may comprise a previously received scan of the user's skin tissue. In addition, or in the alternative, the validation data can include data that the authentication system asks the user to scan from another, randomly selected body part (such as the user's hand, arm, or neck) during the authentication process. The authentication system can compare the facial tissue to the skin tissue from the randomly selected body part to detect whether there are any differences in the skin tissue that suggest an unauthorized party is attempting to impersonate the user.

At step 310, the method determines a confidence level based on comparing the user data to the selected validation data associated with the user. The confidence level indicates how closely the user data corresponds to the validation data. The greater the similarities between the user data and the validation data, the greater the confidence level. At step 312, the method authenticates the user if the confidence level exceeds a pre-defined threshold. If the confidence level is below the pre-defined threshold, the method may perform a fallback authentication procedure based on other authentication techniques (e.g., password, fingerprint, etc.).

FIG. 3B is generally similar to FIG. 3A, however, FIG. 3B uses a second stimulus that is different from the first stimulus in at least one respect. At step 314, the method provides a second stimulus that causes a second involuntary facial movement of the user. The second stimulus may be applied while the successful authentication of step 306 is still valid (e.g., in response to the user seeking to access a computing resource/operation that requires an additional level of authentication) or after the authentication of step 306 has ended (e.g., after the user has signed off or timed out of the authentication completed in step 306), depending on the embodiment.

The second stimulus comprises at least one property that is different than that of the first stimulus. As an example, the first stimulus could apply electric pulses to the user's skin, and the second stimulus could apply a light configured to track the user's eye movements. As another example, the first stimulus could apply electric pulses to the user's skin according to one sequence (e.g., forehead, right cheekbone, left cheekbone), and the second stimulus could apply electric pulses to the user's skin according to a second sequence (e.g., upper lip, lower lip, right cheekbone). In certain embodiments, authentication system 100 may be configured to automatically use a different stimulus from one authentication attempt to the next. By randomizing/dynamically changing the stimulus, authentication system 100 may prevent an unauthorized party from predicting and impersonating the facial movement that corresponds to the stimulus.

At step 316, the method receives second user data in response to the second stimulus. The second user data depicting the second involuntary facial movement of the user, and at step 318, the method performs authentication based on comparing the second user data to second validation data associated with the user. The second validation data comprises a previously validated depiction of the second involuntary facial movement caused by exposing the user to the second stimulus.

Figure 4A:
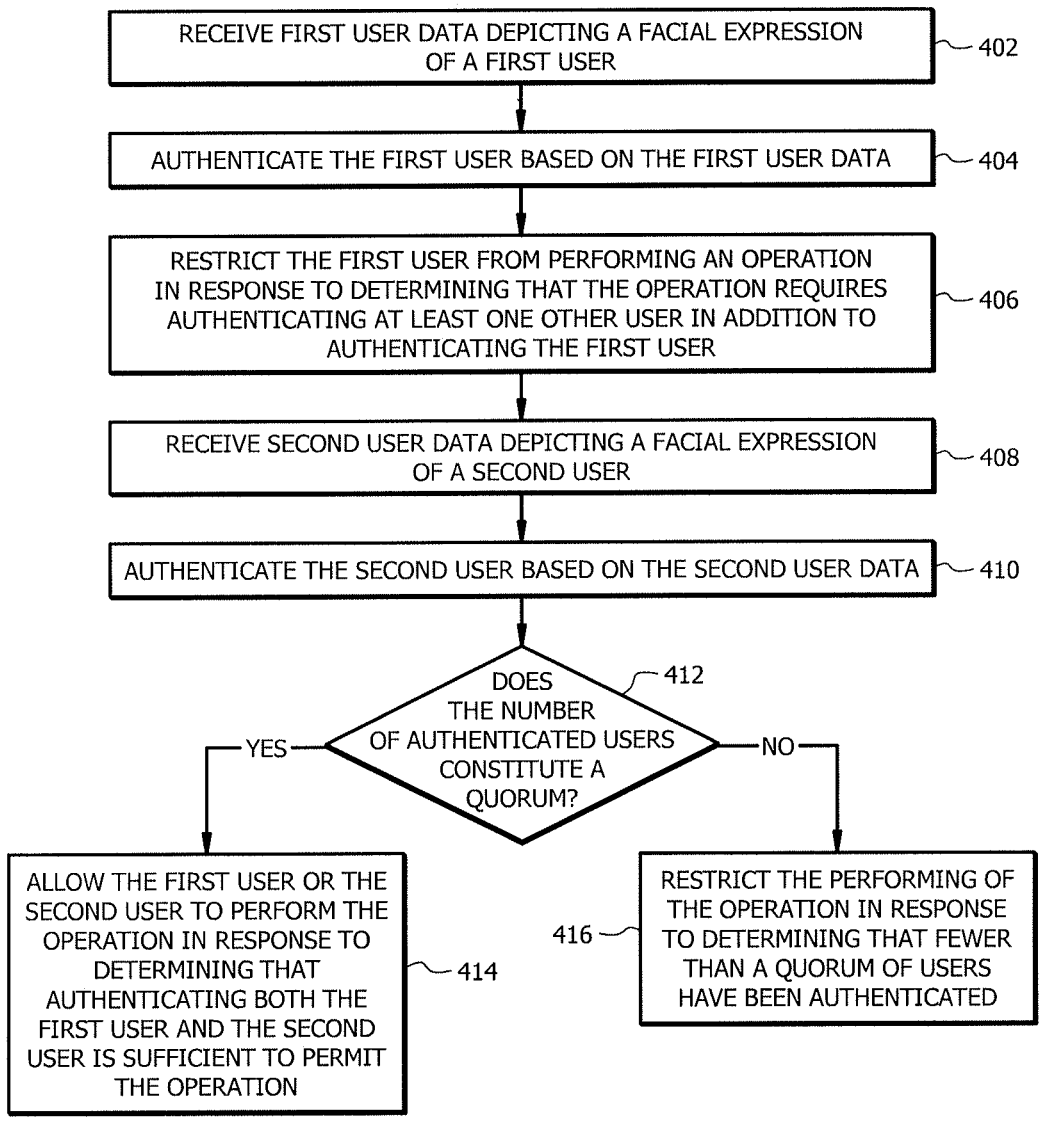
FIG. 4A illustrates an example of a method for authenticating access to a computing resource using quorum-based facial recognition, in accordance with certain embodiments.

FIG. 4A illustrates an example of a method for authenticating access to a computing resource using quorum-based facial recognition, in accordance with certain embodiments. According to certain embodiments, the method may be performed by the authentication system 100 described with respect to FIG. 1A and/or FIG. 1B.

At step 402, the method receives first user data depicting a facial expression of a first user. In certain embodiments, the facial expression may comprise the user's normal/neutral facial expression. In other embodiments, the facial expression may be received in response to prompting the user to make a set of facial expressions according to an authentication pattern (such as described above with respect to FIGS. 2A-2C). In addition, or in the alternative, in certain embodiments, the facial expression may comprise an involuntary movement prompted by a stimulus (such as described above with respect to FIGS. 3A-3B).

At step 404, the method authenticates the first user based on the first user data. For example, the method may determine a confidence level based on comparing the first user data to first validation data. The first validation data depicts a previously validated facial expression associated with the user. The method authenticates the first user if the confidence level exceeds a pre-defined threshold.

At step 406, the method restricts the first user from performing an operation. The restriction is based on determining that the operation requires authenticating at least one other user in addition to authenticating the first user. For example, the restriction may be put in place to increase security by limiting the operations that can be performed by individuals (or by a small number of users). Additionally, the restriction may make it more difficult for an unauthorized party to access computing resources. For example, even if the unauthorized party could trick the authentication system 100 by impersonating one of the users, that would not be sufficient for the unauthorized party to gain access to the computing resources.

At step 408, the method receives second user data depicting a facial expression of a second user. In certain embodiments, the authentication system uses a distributed architecture that allows the first user and second user to be in different geographical locations. For example, the first user could be located in New York and the second user could be located in California. Thus, the first user data is received from a first sensor in the first user's geographical location and the second user data is received from a second sensor in the second user's geographical location. Certain embodiments may not only permit, but may require the users to be in different, pre-configured geographical locations (e.g., pre-configured building, street, city, or GPS coordinates) as an added layer of security. For example, it may be more difficult for an unauthorized party to impersonate different users in different locations.

In certain embodiments, the sensor from which the user data is received may comprise a camera. In some embodiments, the camera may be installed at a facility in which the user is located. In other embodiments, the camera may be installed on a device belonging to the user, such as a laptop, tablet, smartphone, etc. Other embodiments may use more sophisticated sensors configured to track muscle movements or other reactions occurring below the surface of the skin.

At step 410, the method authenticates the second user based on the second user data, and at step 412 the method determines whether the number of authenticated users constitutes a quorum. In certain embodiments, a quorum may comprise a pre-determined number of users belonging to a group of users having authority to perform an operation. As an example, suppose a team includes 20 team members. Authentication system 100 may be configured such that one team member alone cannot perform the operation. For certain operations, two of the team members may need to be authenticated to perform the operation. For other operations, 3, 4, . . . or N team members may need to be authenticated in order to perform the operation. Some operations may require all 20 team members to be authenticated to perform the operation.

In certain embodiments, the pre-determined number of users making up the quorum is based in part on the authorization level of each user requesting to perform the operation. As an example, the quorum could be satisfied by either two team members (if both authenticated team members are senior level team members), three team members (if one authenticated team member is senior level and two authenticated team members are junior level), or five team members (if two authenticated team members are mid-level and three authenticated team members are junior level).

If at step 412 the number of authenticated users constitutes a quorum, the method proceeds to step 414. At step 414, the method allows the operation to be performed in response to determining that at least the quorum of users has been authenticated. For example, suppose two users constitutes a quorum such that authenticating both the first user and the second user is sufficient to achieve a quorum and permit the operation. In this case, the method would allow either the first user and/or the second user to perform the operation in response to determining that a quorum had been achieved. Examples of operations requiring quorum-based authentication could include operations to initiate computerized transactions (such as electronic funds transfers), operations to access one or more computing resources (such as operations to view sensitive information stored in computer memory, operations to modify the configuration of certain computing resources, etc.), or other suitable operations.

If at step 412 the number of authenticated users does not constitute a quorum, the method restricts the first and second users from performing the operation (i.e., in response to determining that fewer than a quorum of users have been authenticated). In certain embodiments, maintaining a quorum may require the members of the quorum to be authenticated during the same time period. Thus, a quorum may exist for a period of time, and then if one of the members required to maintain the quorum signs-off or otherwise becomes unauthenticated, restrictions may be applied with respect to operations that can be performed by the remaining authenticated members (at least until another required member becomes authenticated and the quorum is re-constituted).

Figures 4B, 5:
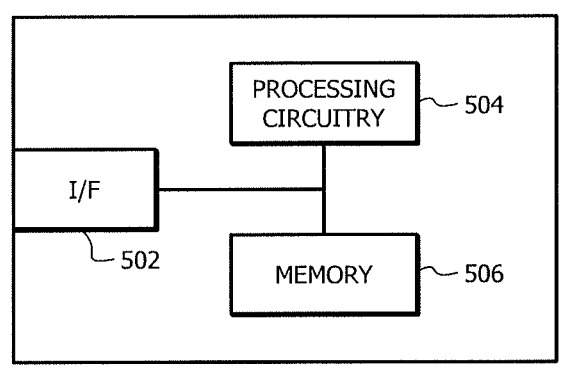
FIG. 4B illustrates an example of patterns that may be used for quorum-based facial recognition, in accordance with certain embodiments.
FIG. 5 illustrates an example of components for the system of FIG. 1A and/or FIG. 1B, in accordance with certain embodiments.

FIG. 4B illustrates an example of patterns that may be used for quorum-based facial recognition, in accordance with certain embodiments. For example, in certain embodiments, to authenticate the quorum of users, authentication system 100 provides a set of prompts to the users being authenticated as part of the quorum. Each user is provided with a respective prompt that prompts that user to make a respective facial expression according to an authentication pattern. For example, a first user may be prompted to smile (facial expression 442A), a second user may be prompted to tilt their chin down (facial expression 442B), and a third user may be prompted to turn their head left (facial expression 442C). Validating the authentication pattern may be generally analogous to the methods described with respect to FIGS. 2A-2B, however, the method of FIG. 4B illustrates that different users can be prompted to provide different parts of the pattern. Although FIG. 4B illustrates one facial expression 442 per user, in other embodiments, one or more of the users may be prompted to make multiple facial expressions 442. For example, each user could be prompted to provide a subpattern of facial expressions 442 within the overall pattern.

As a further level of security, certain embodiments may provide some extra spatial framing compared to traditional facial recognition techniques. For example, in certain embodiments, a facial imprint/spatial facial profile (SFP) can be generated and associated with the user as a unique signature, similar to a fingerprint. The facial imprint may comprise a collection of data points that make up the unique signature. As an analogy to a fingerprint, think of how ridges on the fingers make up a multi-point data set (e.g., 7-point, 10-point, etc.). Similarly, a facial imprint may rely not only on the surface but on a skin tone, ridges, etc. Compared to existing facial recognition techniques (which verify relatively two-dimensional facial characteristics), embodiments of the present disclosure can provide more three-dimensional scanning and penetration scanning. In some embodiments, a series of images can be captured to improve accuracy of the facial imprint. For example, a series of images depicting the facial imprint can be captured as validation data. In some embodiments, information from the series of images can be combined (e.g., using averaging or other statistical technique). In certain embodiments, the facial imprint can be used in the pattern matching, involuntary facial movement, and/or quorum-based techniques described above. An additional option includes scanning or adding other non-facial elements (e.g., the user can hold a sensor/scanner to different body surfaces to capture randomized data used for tokenization).

FIG. 5 illustrates an example of components for the system of FIG. 1A and/or the system of FIG. 1B, in accordance with certain embodiments. The components may be used to implement any of the structures illustrated in FIGS. 1A and/or 1B, such as authentication system 100, user 110, computing resource 120, and/or network 130. The components may comprise any suitable hardware and/or software configured to perform the functionality described above. The components may be implemented using shared hardware or separate hardware. In certain embodiments, components may be distributed in a cloud network environment.

In certain embodiments, the components comprise one or more interface(s) 502, processing circuitry 504, and/or memory(ies) 506. In general, processing circuitry 504 controls the operation and administration of a structure by processing information received from memory 506 and/or interface 502. Memory 506 stores, either permanently or temporarily, data or other information processed by processing circuitry 504 or received from interface 502. Interface 502 receives input, sends output, processes the input and/or output and/or performs other suitable operations. An interface 502 may comprise hardware and/or software.

Examples of interfaces 502 include user interfaces, network interfaces, and internal interfaces. Examples of user interfaces include one or more graphical user interfaces (GUIs), displays, buttons, printers, microphones, speakers, cameras, scanners, credit card readers, check readers, and so on. Network interfaces receive information from or transmit information through a network, perform processing of information, communicate with other devices, or any combination of the preceding. Network interfaces may comprise any port or connection, real or virtual, wired or wireless, including any suitable hardware and/or software, including protocol conversion and data processing capabilities, to communicate through a LAN, WAN, or other communication system that allows processing circuitry 504 to exchange information with or through a network. Internal interfaces receive and transmit information among internal components of a structure.

Processing circuitry 504 communicatively couples to interface(s) 502 and memory 506, and includes any hardware and/or software that operates to control and process information. Processing circuitry 504 may include a programmable logic device, a microcontroller, a microprocessor, any suitable processing device, or any suitable combination of the preceding. Processing circuitry 504 may execute logic stored in memory 506. The logic is configured to perform functionality described herein. In certain embodiments, the logic is configured to perform the methods described with respect to any of FIGS. 2A, 2B, 3A, 3B, and/or 4A.

Memory 506 includes any one or a combination of volatile or non-volatile local or remote devices suitable for storing information. For example, memory comprises any suitable non-transitory computer readable medium, such as Read Only Memory ("ROM"), Random Access Memory ("RAM"), magnetic storage devices, optical storage devices, or any other suitable information storage device or a combination of these devices. Memory 506 may be local/integrated with the hardware used by processing circuitry 504 and/or remote/external to the hardware used by processing circuitry 504.

The scope of this disclosure is not limited to the example embodiments described or illustrated herein. The scope of this disclosure encompasses all changes, substitutions, variations, alterations, and modifications to the example embodiments described or illustrated herein that a person having ordinary skill in the art would comprehend. As an example, although certain examples have described successful facial recognition as a single factor that determines successful authentication, other embodiments may incorporate successful facial recognition as one of the factors in a multi-factor authentication scheme. That is, the multi-factor authentication scheme may be configured to verify facial recognition plus one or more other authentication factors (e.g., verify password, fingerprint, security question, cookie, certificate, link or temporary password sent to previously registered contact information, etc.). In multi-factor authentication embodiments, steps described as authenticating the user based on facial expressions or facial movements may be understood to refer to passing the facial recognition portion of the multi-factor authentication. Passing facial recognition allows the user to perform operations/access computing resources in the sense that the operations/access to the computing resources would be allowed based in part on facial recognition. The other multi-factor authentication factors would also be verified in order for the user to proceed with performing the operations/accessing the computing resources.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

Modifications, additions, or omissions may be made to the methods described herein without departing from the scope of the disclosure. The methods may include more, fewer, or other steps. Additionally, steps may be performed in any suitable order. That is, the steps of any method disclosed herein do not have to be performed in the exact order disclosed, unless explicitly stated.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or." All references to "a/an/the element, apparatus, component, means, step, etc." are to be interpreted openly as referring to at least one instance of the element, apparatus, component, means, step, etc., unless explicitly stated otherwise.

Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although several embodiments have been illustrated and described in detail, it will be recognized that substitutions and alterations are possible without departing from the spirit and scope of the present disclosure, as defined by the appended claims.

The invention claimed is:

1. An authentication system comprising memory operable to store instructions and processing circuitry operable to execute the instructions, whereby the authentication system is operable to:
provide a prompt for a user to make a first set of facial expressions according to a first authentication pattern;
receive first user data depicting the first set of facial expressions from the user;
determine a first confidence level based on comparing the first user data to first validation data, the first validation data depicting previously validated facial expressions associated with the user and arranged according to the first authentication pattern;

authenticate the user in response to a determination that the first confidence level exceeds a first pre-defined threshold;

provide a prompt for the user to make a second set of facial expressions according to a second authentication pattern, wherein the second authentication pattern is different than the first authentication pattern;

receive second user data depicting the second set of facial expressions from the user;

determine a second confidence level based on comparing the second user data to second validation data, the second validation data depicting previously validated facial expressions associated with the user and arranged according to the second authentication pattern;

authenticate the user in response to a determination that the second confidence level exceeds a second pre-defined threshold;

permit the user to perform a first type of operation based on the first confidence level exceeding the first pre-defined threshold; and permit the user to perform a second type of operation based on the second confidence level exceeding the second pre-defined threshold;

wherein, by itself, the first confidence level exceeding the first pre-defined threshold is insufficient to permit the user to perform the second type of operation.

2. The authentication system of claim 1, wherein the prompt comprises instructing the user to perform a gesture.

3. The authentication system of claim 1, wherein the prompt comprises providing a stimulus that causes an involuntary facial movement from the user.

4. The authentication system of claim 1, further operable to require one or more fallback authentication techniques other than facial recognition in response to a determination that the first confidence level is below the first pre-defined threshold.

5. The authentication system of claim 1, further operable to:
  initiate a procedure to update the validation data, the procedure initiated based on a determination that facial recognition has failed a pre-determined number of times.

6. A method, comprising:
  providing a prompt for a user to make a first set of facial expressions according to a first authentication pattern;
  receiving first user data depicting the first set of facial expressions from the user;
  determining a first confidence level based on comparing the first user data to first validation data, the first validation data depicting previously validated facial expressions associated with the user and arranged according to the first authentication pattern; and
  authenticating the user in response to a determination that the first confidence level exceeds a first pre-defined threshold;
  providing a prompt for the user to make a second set of facial expressions according to a second authentication pattern, wherein the second authentication pattern is different than the first authentication pattern;
  receiving second user data depicting the second set of facial expressions from the user;
  determining a second confidence level based on comparing the second user data to second validation data, the second validation data depicting previously validated facial expressions associated with the user and arranged according to the second authentication pattern;
  authenticating the user in response to a determination that the second confidence level exceeds a second pre-defined threshold;
  permitting the user to perform a first type of operation based on the first confidence level exceeding the first pre-defined threshold; and
  permitting the user to perform a second type of operation based on the second confidence level exceeding the second pre-defined threshold;
  wherein, by itself, the first confidence level exceeding the first pre-defined threshold is insufficient to permit the user to perform the second type of operation.

7. The method of claim 6, wherein the prompt comprises instructing the user to perform a gesture.

8. The method of claim 6, wherein the prompt comprises providing a stimulus that causes an involuntary facial movement from the user.

9. The method of claim 6, further comprising: requiring one or more fallback authentication techniques other than facial recognition in response to a determination that the first confidence level is below the first pre-defined threshold.

10. The method of claim 6, further comprising:
  initiating a procedure to update the validation data, the procedure initiated based on a determination that facial recognition has failed a pre-determined number of times.

11. A non-transitory computer readable medium comprising logic that, when executed by processing circuitry, causes the processing circuitry to perform actions comprising:
  providing a prompt for a user to make a first set of facial expressions according to a first authentication pattern;
  receiving first user data depicting the first set of facial expressions from the user;
  determining a first confidence level based on comparing the first user data to first validation data, the first validation data depicting previously validated facial expressions associated with the user and arranged according to the first authentication pattern;
  authenticating the user in response to a determination that the first confidence level exceeds a first pre-defined threshold;
  providing a prompt for the user to make a second set of facial expressions according to a second authentication pattern, wherein the second authentication pattern is different than the first authentication pattern;
  receiving second user data depicting the second set of facial expressions from the user;
  determining a second confidence level based on comparing the second user data to second validation data, the second validation data depicting previously validated facial expressions associated with the user and arranged according to the second authentication pattern; and
  authenticating the user in response to a determination that the second confidence level exceeds a second pre-defined threshold;
  permitting the user to perform a first type of operation based on the first confidence level exceeding the first pre-defined threshold; and
  permitting the user to perform a second type of operation based on the second confidence level exceeding the second pre-defined threshold;
  wherein, by itself, the first confidence level exceeding the first pre-defined threshold is insufficient to permit the user to perform the second type of operation.

12. The non-transitory computer readable medium of claim 11, wherein the prompt comprises instructing the user to perform a gesture.

13. The non-transitory computer readable medium of claim 11, wherein the prompt comprises providing a stimulus that causes an involuntary facial movement from the user.

14. The non-transitory computer readable medium of claim 11, the actions further comprising requiring one or more fallback authentication techniques other than facial recognition in response to a determination that the first confidence level is below the first pre-defined threshold.

* * * * *